US010119555B2

(12) United States Patent
Carez et al.

(10) Patent No.: US 10,119,555 B2
(45) Date of Patent: Nov. 6, 2018

(54) PNEUMATIC ACTUATOR SYSTEM AND METHOD FOR CONTROLLING SUCH AS SYSTEM

(71) Applicant: VOLVO TRUCK CORPORATION, Göteborg (SE)

(72) Inventors: Pierre Carez, St Georges d'Esperanche (FR); Xavier Blanc, Chassieu (FR)

(73) Assignee: Volvo Truck Corporation, Göteborg (SE)

( * ) Notice: Subject to any disclaimer, the term of this patent is extended or adjusted under 35 U.S.C. 154(b) by 200 days.

(21) Appl. No.: 15/035,883

(22) PCT Filed: Dec. 18, 2013

(86) PCT No.: PCT/IB2013/003175
§ 371 (c)(1),
(2) Date: May 11, 2016

(87) PCT Pub. No.: WO2015/092472
PCT Pub. Date: Jun. 25, 2015

(65) Prior Publication Data
US 2016/0281746 A1    Sep. 29, 2016

(51) Int. Cl.
*F15B 11/06*    (2006.01)
*B60T 17/02*    (2006.01)
(Continued)

(52) U.S. Cl.
CPC ............ *F15B 11/06* (2013.01); *B60T 13/662* (2013.01); *B60T 13/683* (2013.01); *B60T 17/02* (2013.01);
(Continued)

(58) Field of Classification Search
CPC ...... F15B 11/06; B60T 13/683; B60T 13/662; B60T 17/02
See application file for complete search history.

(56) References Cited

U.S. PATENT DOCUMENTS 3,400,636 A * 9/1968 Schneider ............. F15B 11/064
60/408
4,077,743 A * 3/1978 Cochrane ................ F04B 41/06
417/243
(Continued)

FOREIGN PATENT DOCUMENTS

GB         575858 A     3/1946
GB         750999 A     6/1956
JP       2002-174203 A  6/2012

OTHER PUBLICATIONS

Japanese Official Action (translation) (dated Jun. 12, 2017) for corresponding Japanese App. 2016-541169.
(Continued)

*Primary Examiner* — Thomas E Lazo
(74) *Attorney, Agent, or Firm* — WRB-IP LLP

(57) ABSTRACT

A pneumatic actuator system includes at least an actuator, a compressor providing compressed air to the actuator, a first intake conduit supplying the compressor with external air, and a second intake conduit connected to an exhaust line of the actuator and supplying the compressor with air discharged from the actuator. The pneumatic actuator system also includes a selecting valve which is arranged on the exhaust line of the actuator, between the actuator and the compressor, this valve being able to switch between a recirculation position, where the air flow is directed back to the compressor and an exhaust position where the air flow is directed to a low pressure circuit.

18 Claims, 5 Drawing Sheets

(51) Int. Cl.
*F15B 11/064* (2006.01)
*B60T 13/66* (2006.01)
*B60T 13/68* (2006.01)
*F15B 21/14* (2006.01)

(52) U.S. Cl.
CPC ............ F15B 11/064 (2013.01); *F15B 21/14* (2013.01); *F15B 2211/4159* (2013.01); *F15B 2211/426* (2013.01); *F15B 2211/428* (2013.01); *F15B 2211/6306* (2013.01); *F15B 2211/7052* (2013.01); *F15B 2211/88* (2013.01); *F15B 2211/8855* (2013.01)

(56) References Cited

U.S. PATENT DOCUMENTS

| | | | | |
|---|---|---|---|---|
| 5,382,085 | A * | 1/1995 | Zbinden | B60T 13/74 |
| | | | | 303/10 |
| 5,779,325 | A * | 7/1998 | Diesel | B60T 13/683 |
| | | | | 188/170 |
| 5,832,728 | A * | 11/1998 | Buck | B60K 8/00 |
| | | | | 60/407 |
| 2005/0126383 | A1* | 6/2005 | Nagai | F02D 13/04 |
| | | | | 91/165 |

OTHER PUBLICATIONS

International Search Report (dated Aug. 21, 2014) for corresponding International App. PCT/IB2013/003175.

\* cited by examiner

PNEUMATIC ACTUATOR SYSTEM AND METHOD FOR CONTROLLING SUCH AS SYSTEM

BACKGROUND AND SUMMARY

The invention concerns a pneumatic actuator system and a method for controlling such a system. The invention can be applied to any mechanism including a pneumatic actuator. For instance, vehicles use often pneumatic actuators for parking brakes or service brakes.

Considering the example of a truck, the actuation system is open, which means that the ambient air is drawn in an air inlet pipe, compressed by a compressor and sent to the different actuators of the vehicle brake by means of an air management system. The actuators use the compressed air during a braking operation and reject it, via an exhaust line, after use. On most systems, the air discharged by actuators is rejected directly in the atmosphere and the compressor is supplied, at each cycle, with air at atmospheric pressure. Commonly the air management system of a brake system is defined to work between 5 and 12.5 bars. This high pressure level leads to high power demand of the compressor when working with ambient air.

A basic solution is to use a supercharged compressor, that is a compressor using air that is already compressed. In that way, the power required by the compressor is less important than the power needed when using ambient air.

Two concepts are known to create a supercharged compressor. A first concept consists in or comprises adding a turbine on the air inlet line of the compressor. However, this implies a supplementary cost and adds packaging constraints. A second concept is to take air directly in the engine air inlet manifold. In this way, there is no need for extra devices to divert the air flowing in the engine, but the air consumption of the compressor disrupts the engine combustion tuning.

Another solution is to create a closed loop in the pneumatic actuator system, which means that the air discharged by the actuator is collected and put back into circulation in the pneumatic actuator system. The air discharged by the actuator being at a pressure superior to the atmospheric pressure, the energy consumed by the compressor is reduced.

Such a pneumatic actuator system is disclosed in DE-A-10 2008 045 713. This pneumatic actuator system is designed so that the compressed air discharged by the actuator, for instance service brake actuators, is directed towards a pneumatic cylinder. This pneumatic cylinder comprises a first chamber for receiving discharged air and a second chamber separated from the first chamber by a piston. A spring tends to push the piston so that the volume of the first chamber is compressed. Therefore, the pressure of the air discharged by the different actuators pushes the piston against the elastic action of the spring. Then, the volume of the first chamber increases and the pressure diminishes consequently. The air accumulated in the first chamber of the pneumatic cylinder is used afterwards by the compressor. The major drawback of this system is that, in case of an important brake operation, a large volume of air at high pressure would be rejected by the actuators and the expansion of the first chamber, receiving this volume would not decrease the pressure under a satisfactory pressure for the actuators. Therefore, the air flowing in the system might be over-pressurized so that the actuators can't work properly. More precisely, actuators are traditionally of the "simple effect" type, during a working phase, the pressure applied at the inlet makes it change from a release position to a working position. After this working phase, the pressure at the inlet must decrease during an exhaust phase to allow the actuator to come back to its release position. In the pneumatic actuator system of DE-A-10 2008 045 713, the pressure at the inlet of the actuator can remain too important during the exhaust phase. Consequently, the capacity of the actuator to come back to its release position can be limited.

GB-A-2 344 389 discloses a pneumatic actuator system working with a servo device. The system comprises a compressor, means for drawing atmospheric air in the system, and an air tank divided into a low pressure compartment and a high pressure compartment. The servo device is activated by an effort on the pedal brake of the vehicle. In operating conditions, the compressor draws air from the low pressure compartment, compresses it and rejects it in the high pressure compartment. The actuator assembly has a housing defining a working chamber, which is supplied with compressed air coining from the high pressure compartment. The air discharged by the actuators flows then to the low pressure compartment, which implies that the pressure inside the low pressure compartment increases. Here again, in case of a hard braking operation, the air flowing in the system might be over pressurized.

An aspect of the present invention involves a pneumatic actuator system functioning in closed loop, while preventing an overpressure to occur in the system.

To this end, the invention concerns a pneumatic actuator system, comprising at least one pneumatic actuator, a compressor, providing compressed air to the pneumatic actuator, a first intake to supply the compressor with external air, and a second intake connected, via a recirculation line, to an exhaust line of the pneumatic actuator and arranged to supply the compressor with air discharged from the pneumatic actuator.

According to the invention, the pneumatic actuator system also includes a selecting valve which is arranged on the exhaust line of the pneumatic actuator, between the pneumatic actuator and the compressor, this selecting valve is switchable between a recirculation position, where the air flow is directed to the recirculation line and an exhaust position where the air flow is directed to a low pressure circuit, depending at least on pressure of air in the recirculation line downstream from said selecting valve or in an air tank of the pneumatic actuator system that is arranged downstream from the selecting valve on the recirculation line and wherein air discharged from the pneumatic actuator can accumulate.

Thanks to the invention, the pneumatic actuator system can function in closed loop without risking an overpressure of the air flowing in the system. Indeed, in the recirculation position, the valve directs the air flow exhausted by the actuator back to the compressor while, in the exhaust position, the air discharged by the actuator is vented to the low pressure circuit. In this way, only a sufficient amount of compressed air exhausted by the actuator is reused, the remaining amount of air being vented to the low pressure circuit. Therefore, given that the amount of air put back into circulation is controlled, there is limited risk to disrupt the functioning of the pneumatic actuator.

According to further aspects of the invention which are advantageous but not compulsory, such a pneumatic actuator system may incorporate one or several of the following features:

The low pressure circuit is opened to the atmosphere or is connected to the circuit of a low pressure system.

The air tank is arranged between the selecting valve and the second intake.

The selecting valve switches in the exhaust position when the pressure of air in the air tank, or in the recirculation line. Increases to a pressure threshold value.

The system may further comprise at least one pressure sensor to measure pressure of the air in the recirculation line downstream from said selecting valve or in the air tank (16).

Alternatively, the system can comprise at least two pressure sensors:
  a first one to measure downstream from the selecting valve in the recirculation line or preferably in the air tank, a first air pressure and
  a second one to measure upstream of the selecting valve, preferably in an outlet of the pneumatic actuator, in the exhaust line of the pneumatic actuator or in the pneumatic actuator, for instance in a working chamber or in an exhaust chamber of the pneumatic actuator, a second air pressure.

In this case the system may comprise an electric unit or electronic control unit configured to compare the electric or electronic signals generated by the first sensor depending on the first air pressure and by the second sensors depending on the second air pressure and configured to generate a new signal depending on the result of the comparison to control the position of the selecting valve.

The selecting valve can switch in the exhaust position when the first air pressure is balanced with the second air pressure.

Alternatively, the selecting valve switches in the exhaust position when the difference between the first air pressure and the second air pressure is inferior to a threshold value.

The system includes another valve, which allows switching between external air and air discharged from the pneumatic actuator in order to supply the compressor.

The system includes several pneumatic actuators and an air management system which carries out the repartition of air between the different pneumatic actuators of the system.

Besides, another subject matter of the invention is a method for controlling a pneumatic actuator system of a vehicle wherein said pneumatic actuator system comprises:
  at least one pneumatic actuator,
  a compressor, providing compressed air to the pneumatic actuator,
  a first intake, to supply the compressor with external air,
  a second intake, connected to an exhaust line of the pneumatic actuator, via a recirculation line, and arranged to supply the compressor with air discharged from the pneumatic actuator, and
  as selecting valve which is arranged on the exhaust line of the pneumatic actuator, between the pneumatic actuator and the compressor, and
  which is able to switch between a recirculation position, where the air flow is directed to the recirculation line, and an exhaust position where the air flow is directed to a low pressure circuit,
  Said method comprises the steps of
  detecting at least one pressure of air between the pneumatic actuator and the second intake,
  switching the selecting valve between said recirculation position and said exhaust position depending on said at least one pressure of air.

Preferably, the step of detecting at least one air pressure between the pneumatic actuator and the second intake comprises the detection of a pressure of air in the recirculation line downstream from the selecting valve or in an air tank that is arranged on the recirculation line downstream from the selecting valve and wherein the air discharged from the pneumatic actuator can accumulate.

Preferably, in the step of switching the selecting valve between said recirculation position and said exhaust position depending on said at least one pressure of air, the selecting valve switches in the exhaust position when the air pressure in the air tank or in the recirculation line, increases to a pressure threshold value.

Alternatively, the step of detecting at least one air pressure between the pneumatic actuator and the second intake comprises the detection of a first pressure of air in the recirculation line downstream from the selecting valve or preferably the detection of a first pressure of air in an air tank arranged on the recirculation line downstream from the selecting valve, and also comprises the detection of a second pressure of air upstream from said selecting valve preferably in an outlet of the pneumatic actuator, in the exhaust line of the pneumatic actuator or in the pneumatic actuator, for instance in a working chamber or in an exhaust chamber of the pneumatic actuator.

Following the step of detecting at least one pressure of air between the pneumatic actuator and the second intake, the method may further comprise a step of comparing the first and the second pressures of air.

In an implementation of the method, in the step of switching the selecting valve between said recirculation position and said exhaust position depending on said at least one pressure of air, the selecting valve switches in the exhaust position when the first pressure of air is balanced with the second pressure of air.

In another implementation, in the step of switching the selecting valve between said recirculation position and said exhaust position depending on said at least one pressure of air, the selecting valve switches in the exhaust position when the difference between the first pressure of air and the second pressure of air is inferior to a threshold value.

BRIEF DESCRIPTION OF THE DRAWINGS

The invention will now be explained in correspondence with the annexed figures, and as an illustrative example, without restricting the invention. In the annexed figures.

DETAILED DESCRIPTION

Figure 1:
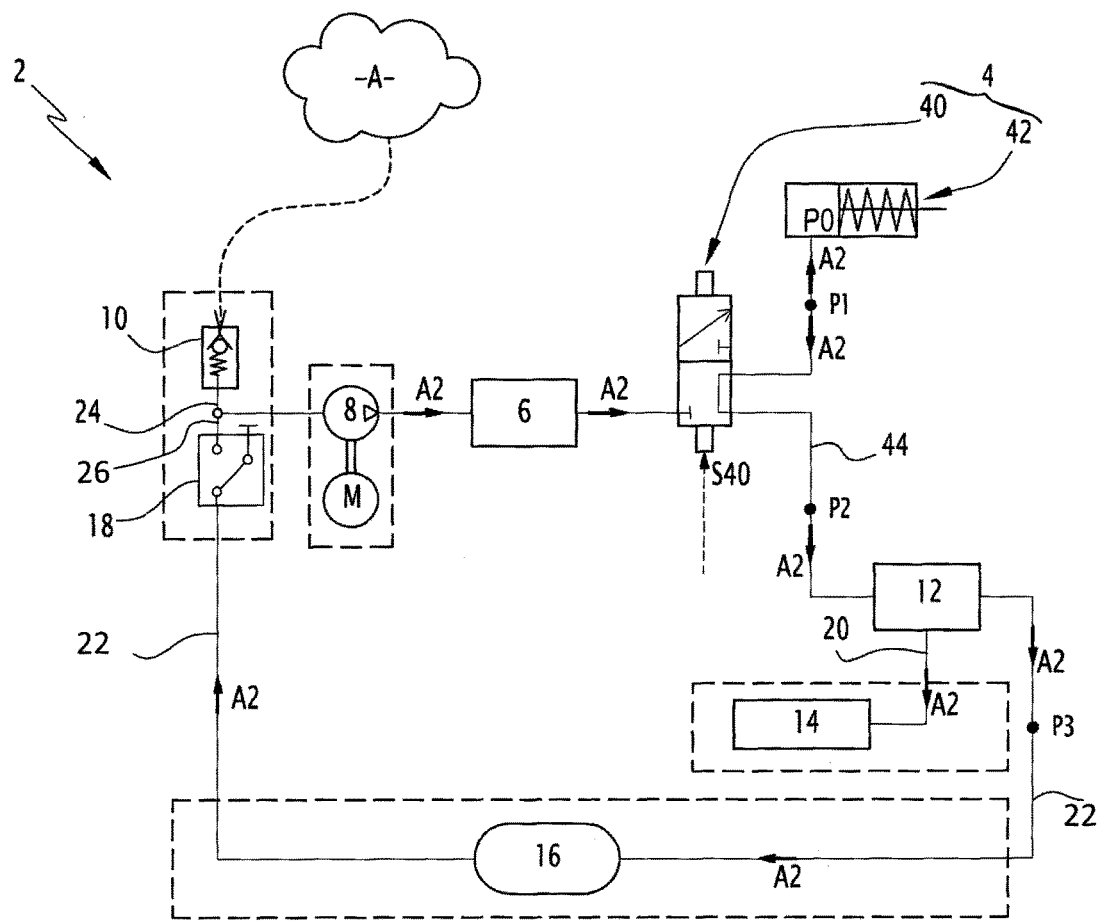
FIG. 1 is a schematic view of a pneumatic actuator system according to the invention.

FIG. 1 represents a pneumatic actuator system 2. In particular, this pneumatic actuator system can be the pneumatic brake system of a vehicle, such as a truck. The system 2 includes a pneumatic actuator 42 and a switching valve 40 in fluid connection with the pneumatic actuator 42. On FIG. 1, the switching valve 40 is arranged separately from the pneumatic actuator 42 but in a variant it can be attached or integrated in the pneumatic actuator 42. When the pneumatic actuator system is a pneumatic brake system, the pneumatic actuator 42 may be a brake actuator such as a service brake actuator. Such as depicted on FIG. 1, the switching valve 40 can be a distributor. The switching valve 40 is controlled by a non-represented control unit, which sends a signal S40 to the switching valve 40. Depending on the nature of the signal S40, the switching valve 40 switches between at least a feeding position and a discharge position. On FIG. 1 the switching valve 40 is represented in the discharge position. The feeding position of the switching valve 40 corresponds to a working phase of the pneumatic actuator 42, that is to say when the pneumatic actuator 42 is supplied with pressurized air and is switched into a working position. The discharge position of the switching valve 40 corresponds to an exhaust phase of the pneumatic actuator 42 that is to say when air is discharged from the pneumatic actuator 42 via an exhaust line 44 such that the pneumatic actuator 42 can switch from a working position to a release position. The pneumatic actuator 42 and, more generally, the pneumatic actuators of all kind are sensitive to residual back pressure that can remain, during exhaust phase, in the exhaust line 44. This residual back pressure causes a counter-pressure in the pneumatic actuator 42 that is detrimental for a proper functioning of pneumatic actuator, in particular residual back pressure, can limit the capacity of the pneumatic actuator to return into a release position. Therefore, it is important to minimize pressure is the exhaust line of the pneumatic actuator during exhaust phase in order to ensure, for instance, the return of the pneumatic actuator into a release position.

On FIG. 1, only one pneumatic actuator 42 is represented while, as an alternative, several actuators can be included in the pneumatic actuator system 2 of the vehicle. For example, in a braking system, a brake actuator can be provided for each wheel of a vehicle.

In practice, an air management system 6 controls the distribution of compressed air to each actuator. This air management system 6 can be arranged downstream a compressor 8 which is driven by a motor M. The motor M might, for example, be the main internal combustion engine of the vehicle.

A suction valve 10 is arranged upstream the compressor 8 and is used to draw ambient air A. As depicted on FIG. 1, the suction valve 10 can be a one-way valve, which means that air flowing inside the pneumatic air system 2 cannot be exhausted in the atmosphere through the suction valve 10. The suction valve 10 is connected to a first air intake 24 to supply the compressor 8 with external air A.

A selecting valve 12 is arranged downstream of the pneumatic actuator 42 more precisely on the exhaust line 44 of the pneumatic actuator 42. Therefore, the air flowing through the selecting valve 12 corresponds to the air discharged from pneumatic actuator 42. The selecting valve 12 switches between a first position where the air flowing in the exhaust line 44 of the pneumatic actuator 42 is sent back into circulation within the system 2 and a second position where the air discharged by the pneumatic actuator 42 is vented to a low pressure circuit 14. Therefore, the first position of the selecting valve 12 is hereafter called the "recirculation position", while the second position of the selecting valve 12 is hereafter called the "exhaust position".

On FIG. 1, the air flowing in the system 2 is represented by arrows A2.

On FIG. 1, in the recirculation position, the air discharged from the pneumatic actuator 42 flows through a recirculation line 22 arranged downstream from the selecting valve 12, while in the exhaust position, the air flows through a venting line 20 to the low pressure circuit 14. This low pressure circuit 14 can be opened to the atmosphere or can be used for another application, for instance, in a low pressure system such a horn system, a urea injector cleaning system or an engine boost pressure system. An air tank 16 is preferably arranged on the recirculation line 22, where air discharged by the pneumatic actuator 42 can accumulate. A switching valve 18 is arranged between the recirculation line 22 and the compressor 8. The switching valve 8 can switch between a natural aspiration position and a supercharged position. In the supercharged position of the switching valve 18, the compressor 8 can draw air accumulated in the air tank 16 via a second air intake 26 that is connected to the switching valve 18. In the supercharged position, the compressor uses air that is already compressed and stored in the air tank 16. Therefore, the compressor 8 consumes less energy than it does when working with air at atmospheric pressure. This allows boosting the delivery of the compressor 8, reducing the energy consumed by it for pumping and reducing the oil rejection of the compressor 8.

In practice, the switching valve 18 can be a shut-off valve 18. In the supercharged position, the shut-off valve 18 establishes a fluid connection between the recirculation line 22 and the second air intake 26 to supply the compressor 8 with pressurized air during the charging phases of the pneumatic air system in order to create a supercharged compressor. A "charging phase" refers to a phase where the compressor is operated. During a non-charging phase, that is to say when the compressor is in a rest position, the shut-off valve 18 is switched into the natural aspiration position where it isolates the recirculation line from the compressor 8.

If during the charging phase the pressure of air in the recirculation line 22 or in the air tanks 16 becomes insufficient, in other words if it becomes inferior to the opening pressure of the suction valve 10, the suction valve 10 opens and the compressor can draw external air A via the first an intake 24 and the suction valve 10 even if the shut off valve 18 is in the supercharged position.

Preferably, this strategy will supply the compressor 8 with pressurized air only during charging phases in order to create a supercharged compressor and the shut off valve 18 isolate the recirculation loop during the non-charging phases in order to avoid pressure loss and in order to keep a maximum of energy in the recirculation line 22.

Hereafter, P0 denotes the pressure in the pneumatic actuator 42, for instance in the working chamber 43 or, when provided, in the exhaust chamber of the pneumatic actuator 42. P1 denotes the pressure of the air discharged from the pneumatic actuator 42. P2 denotes the pressure of air in the exhaust line 44 of the pneumatic actuator 42. P3 denotes the pressure of the air sent back into circulation. P4 denotes the pressure in the air tank 16. P1 is preferably measured at the outlet 46 of the pneumatic actuator 42 and P3 can be measured on the recirculation line 22 downstream from the selecting valve 12 and upstream of the tank 16.

Hereafter, several embodiments of the invention are described. The following embodiments differ from each other because selecting valves 12 are different and/or because they are controlled differently. That's why for the sake of clarity, in the FIGS. 2, 4, 6 and 7 only a part of the pneumatic actuator system 2, with the selecting valves 12, is depicted.

Hereafter, functioning of the first embodiment, hereinafter called "low pressure recirculation loop", is explained in connection with FIGS. 2 and 3. On FIG. 3, the pressure P1 in the pneumatic actuator 42 is represented in full line while the pressure P3 is represented as a dashed line.

The pressure P3 of the air sent back into circulation is measured by means of a sensor M1, for instance an electro-pneumatic sensor, which sends a signal S1 to the selecting valve 12, this signal S1 can be an electric signal representative of the pressure P3. S1 control an electro-mechanic actuator 27 of the selecting valve 12, for instance, an electromagnet able to switch the selecting valve 12 from the recirculation position to the exhaust position. When the electro-mechanical actuator 27 is not activated, a spring 25 can be used to switch the selecting valve 12 from the exhaust position to the recirculation position and to maintain the selecting valve 12 in the recirculation position. When the pneumatic actuator 42 is in its release position, the air used by the pneumatic actuator 42 is discharged and the pressure in the air tank 16 increases. When the pressure P3 in the recirculation line 22 raises up to a predetermined threshold value P3$th$, the signal S1 activates the electro-mechanic actuator 27, the selecting valve 12 switches to the exhaust position and the remaining quantity of air discharged from the actuator 4 is sent to the low pressure circuit 14. When pressure P3 drops below P3$th$, the signal S1 deactivates the electro-mechanic actuator 27 and the selecting valve 12 switches from the exhaust position to the recirculation position. The threshold value P3$th$ used by the selecting valve 12 to switch between its two positions is approximately equal to a pressure value comprised between 3 to 20% of the pressure used by the pneumatic actuator in the working phase. In practice, considering for instance a service brake actuator which requires during braking operation air at 5 bars, the threshold value P3$th$ used by the selecting valve 12 to switch between its two positions can be approximately of 0.5 relative bar. This means that, when the selecting valve 18 is in the supercharged position, the compressor 8 uses air from the air tank 16 with a pressure that is about 0.5 bar with regards to the atmospheric pressure, that is air at an absolute pressure of about 1.5 bar. On FIG. 3, E1 represents the amount of energy recovered thanks to the recirculation of air.

Figure 3:
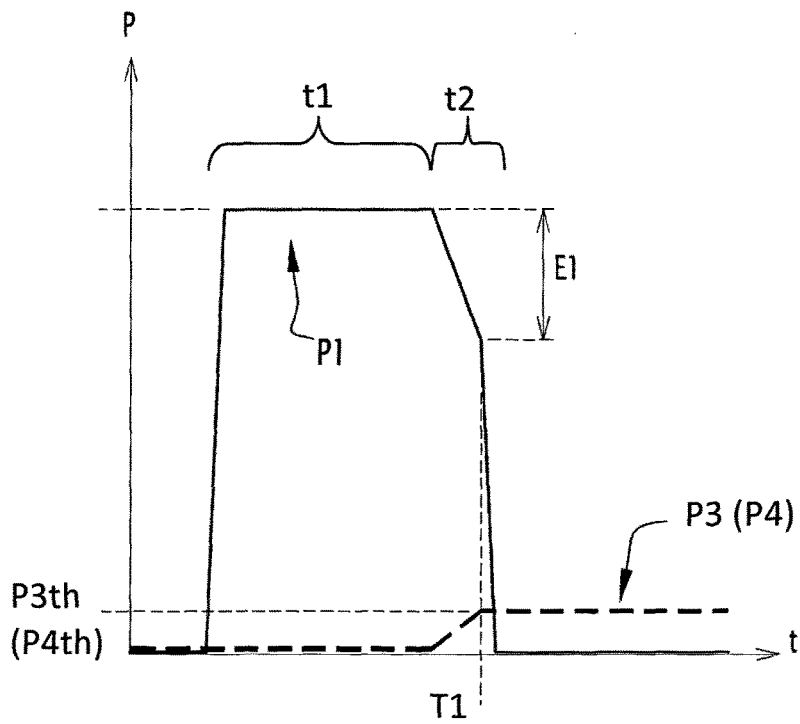
FIG. 3 is a chart representing the pressure of the actuator and the pressure in the air tank plotted over time, in operating conditions of the selecting valve according to the first embodiment.

On FIG. 3, the working position of the pneumatic actuator 42 is identified by a curly brace a while the exhaust phase of the pneumatic actuator 42, corresponding to a switching transition of the pneumatic actuator 42 from its working position to its release position, is identified by a curly brace t2. During the exhaust phase t2, the pressure P3 increases up to the threshold value Pth3. At this time, the selecting valve 2 switches from the recirculation position to the exhaust position. The moment of switching is represented on FIG. 4 by a vertical dashed line T1. As from the switching moment, pressure P3 in the recirculation line 22, or pressure P4 in the air tank 16, remains substantially constant, more precisely substantially equal to the threshold value P3$th$ while the pressure P1 at the outlet 46 of the pneumatic actuator 42 continues to drop to 0 bar when the low pressure circuit 14 is opened to the atmosphere or to a pressure closed to 0 when the low pressure circuit 14 is used for another application. The pressure P4 in the air tank 16 remains constant until the switching valve 18 switches into the supercharged position to supply the compressor 8 with pressurized air during the charging phases. Therefore, after the selecting valve 12 has switched in the exhaust position, the amount of remaining pressurized air is vented, which eases the return of the pneumatic actuator 42 to a predetermined or release position.

Instead of measuring the pressure P3 in the recirculation line 22, the sensor 1 can measure the pressure P4 in the air tank 16. In this case, the signal S1 can be an electric signal representative of the pressure P4. When the pressure P4 in the air tank 16 raises up to a predetermined threshold value P4$th$ that may be equal to P3$th$, the selecting valve 12 switches to the exhaust position.

Figure 4:
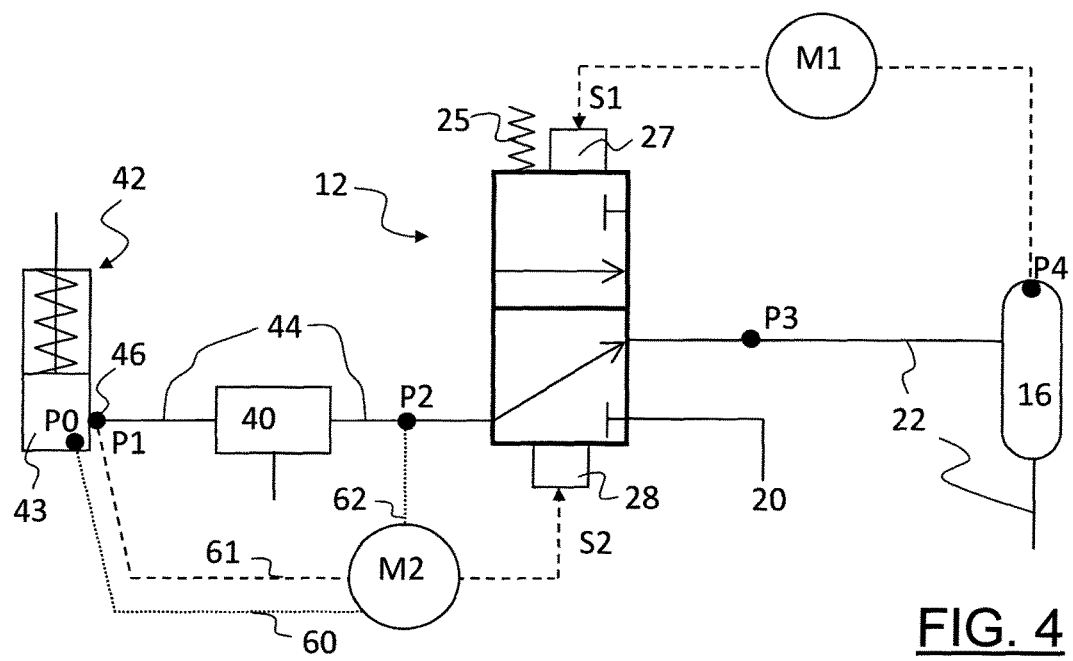
FIG. 4 is a schematic view showing a part of a pneumatic actuator system, with a selecting valve, according to a second embodiment of the invention.
Figure 5:
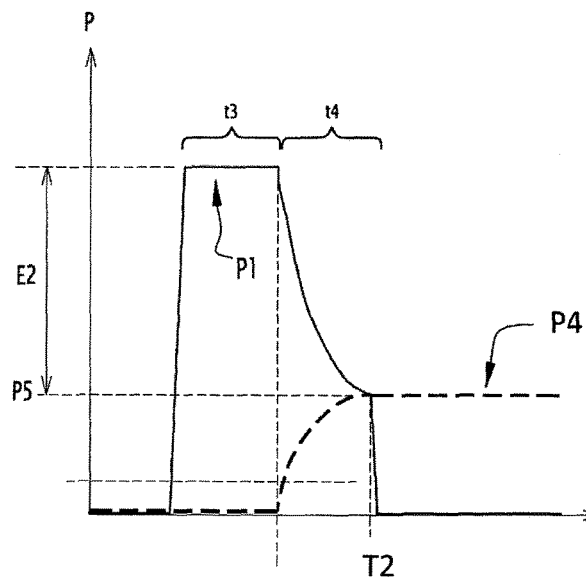
FIG. 5 is a chart representing the pressure of the actuator and the pressure in the air tank plotted over time, in operating conditions of the selecting valve according to the second embodiment.

Here below, the functioning of the second embodiment, hereinafter called "high pressure recirculation loop", is explained in connection with FIGS. 4 and 5. Only the differences of functioning with the first embodiment are explained.

In this case, the pressure P4 or a value representative of the pressure PA is measured by the first sensor M1 and the pressure P1 at the outlet of the pneumatic actuator 42 is also measured by a second sensor 2. Sensor 2 can also be an electro-pneumatic sensor. When the pneumatic actuator 42 is released, the pressure P4 increases in the air tank 16, until the pressure P4 balances with the pressure P1. When the equilibrium is reached, the selecting valve 12 switches from the recirculation position to the exhaust position. For this to happen, a signal S1 is sent by the sensor M1 to a first electro-mechanical actuator 27 of the selecting valve 12 and a signal S2 is sent by the sensor M2 to a second electro-mechanical actuator 28 of the selecting valve 12. As long as P1 is superior to P4, the force generated by the second electro-mechanical actuator 28 is greater than the force generated by first electro-mechanical actuator 27 so that the selecting valve is maintained in the recirculation position. When signals S1 and S2 provide the information that the pressure P4 equals or is superior to the pressure P1, first and second electro-mechanical actuators 27, 28 generate the same force and the additional force generated by the spring 25 causes the selecting valve 12 to switch to its exhaust position. In an alternative, when signals S1 and S2 provide the information that the pressure P4 equals or is superior to the pressure P1, first and second electro-mechanical actuators 27, 28 are sized so that the force generated by the first electro-mechanical actuator 27 is greater than the force generated by the second electro-mechanical actuator 28 that causes the selecting valve 12 to switch to its exhaust position. On FIG. 5, the working phase of the pneumatic actuator 42 is identified by a curly brace t3 while the exhausting phase is represented by a curly brace t4. When the discharge period t4 begins, the pressure inside the air tank 16 increases up to an equilibrium pressure P5 which corresponds to the pressure obtained at the equilibrium when P4=P1. In other words, when the pressure P4 and the pressure P1 are equal to the same pressure P5, the selecting valve 12 switches to the exhaust position and the remaining quantity of pressurized air discharged from the pneumatic actuator 42 is directed to the low pressure circuit 14. The pressure P1 at the outlet 46 of the pneumatic actuator 42 drops to 0 bar or to a pressure close to 0. The moment of switching is represented on FIG. 5 by a vertical dashed line T2. On FIG. 5, E2 represents the amount of energy recovered thanks to recirculation. This amount E2 is superior to the amount E1 of the first embodiment.

Alternatively, instead of measuring pressure P1, the second sensor M2 may measure the pressure P0 in the pneumatic actuator 42, for instance, in the working chamber 43 of the pneumatic actuator 42. According to this alternative the pressure P4 is compared to the pressure in the pneumatic actuator 42 in order to control the position of the selecting valve 12. In another alternative, it is the pressure P2 on the exhaust line 44 of the pneumatic actuator 42 that is measured. According to this other alternative the pressure P4 is compared to the pressure P2 in order to control the position of the selecting valve 12.

In the second embodiment, the pressure P4 inside the air tank 16 can increase at each operation cycle if the switching valve 18 is not meantime switched in the supercharged position. Each operation cycle corresponds to a working phase followed by an exhaust phase. Therefore, the pressure P5 at equilibrium is a floating threshold while the threshold value Pth3 or Pth4 according to the first embodiment remain constant.

Because Pth3 and Pth4 can be chosen at very low pressure, the first embodiment can be better adapted for a pneumatic actuator system 2 which needs a recirculation line operating at low pressure. The second embodiment, that allows a better energy recovering than the first, can be better adapted for a pneumatic actuator system 2 whose recirculation line can operate at high pressure.

In the two embodiments of the pneumatic actuator system, the moment of switching of the selecting valve 12 is at least defined by the pressure P3 measured in the recirculation line or by the pressure P4 measured in the air tank 16. The switching of the selecting valve 12 can be controlled electronically, electrically, pneumatically or mechanically.

Figure 2:
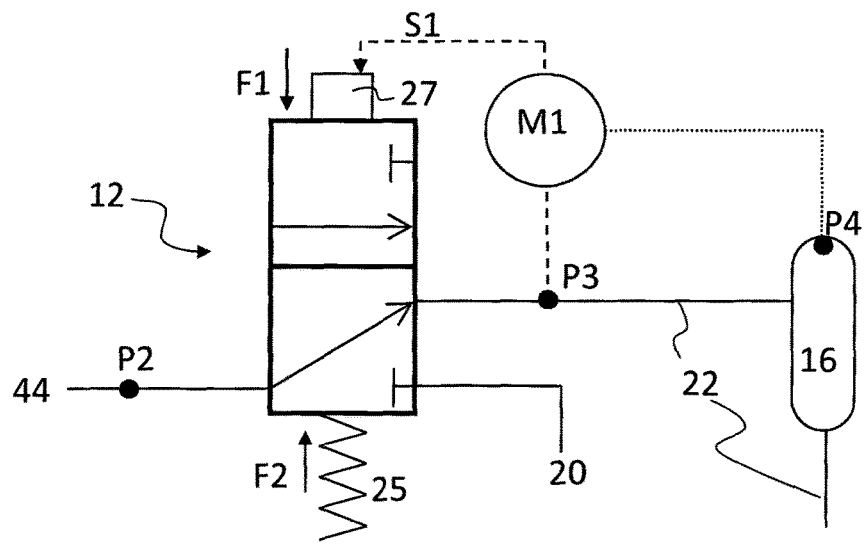
FIG. 2 is a schematic view showing a part of a pneumatic actuator system, with a selecting valve, according to a first embodiment of the invention.
Figure 6:
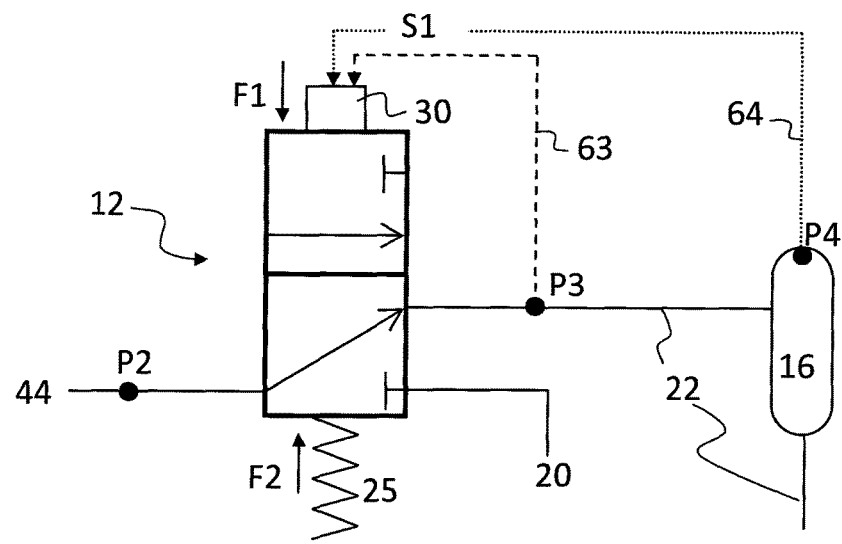
FIG. 6 is a schematic view showing a part of a pneumatic actuator system, with a selecting valve, according to a third embodiment of the invention.

In a third embodiment depicted on FIG. 6, the pneumatic actuator system 2 is functioning in the same way as the first embodiment of FIG. 2 does, the sensor M1 is not provided and the selecting valve 12 is pneumatically controlled via a pneumatic connection 63 between the recirculation line 22 and the selecting valve 12. In this case, the signal S1 is a pneumatic signal at the same pressure as P3 or at a pressure that is function of P3 for instance by using a non-represented relay valve. S1 feed a pneumatic control actuator 30 attached to the selecting valve or part of the selecting valve 12 and able to generate a force F1 that opposes to the force F2 generated by a spring 25 of the selecting valve 2. The spring 25 is calibrated such that the selecting valve 12 switches in the exhaust position when pressure P3 reaches P3$th$ and generates a force F1 greater than the force F2 generated by the spring 25. In an alternative of this third embodiment, the selecting valve 12 can also be controlled via a pneumatic connection 64 between the air tank 16 and the selecting valve 12 and the signal S1 is a pneumatic signal that is equal to or function of pressure P4.

Figure 7:
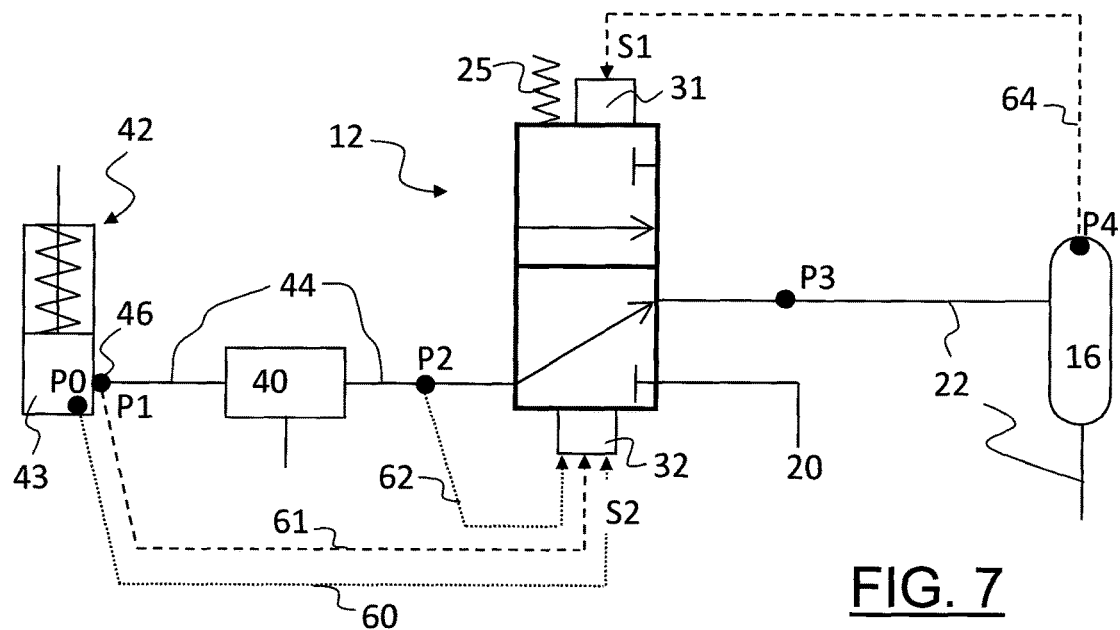
FIG. 7 is a schematic view showing a part of a pneumatic actuator system, with a selecting valve, according to a fourth embodiment of the invention.

In a fourth embodiment depicted on FIG. 7 wherein the pneumatic actuator system 2 is functioning in the same way as the second embodiment of FIG. 2 does, the electro-pneumatic sensors M1 and M2 are not provided and the selecting valve 12 is pneumatically controlled thanks to two pneumatic signals S1 and S2 and two pneumatic control actuators 31 and 32 which are attached to or part of the selecting valve 12. Through a first pneumatic connection 64 that connects the air tank 16 to the first pneumatic control actuator 31, the first pneumatic control actuator 31 is fed by the pneumatic signal S1 which is at the same pressure as P4 or which is at a pressure that is function of the pressure P4, for instance, by using a non-represented relay valve. Through a second pneumatic connection 61 that connects the second pneumatic control actuator 32 to the outlet 46 of the pneumatic actuator 42, the second pneumatic control actuator 32 is fed by the pneumatic signal S2 which is at the same pressure as P1 or which is at a pressure that is function of the pressure P1. In a first alternative, the second pneumatic connection 62 can connect the second pneumatic control actuator 32 of the selecting valve 12 to the exhaust line 44 such that the pneumatic signal S2 is at a pressure that is equal to or that is function of the pressure P2. In another alternative, the second pneumatic connection 60 can connect the selecting valve 12 to the inside of the pneumatic actuator 42, for instance to the pressure chamber 43, such that the pneumatic signal S2 is at a pressure that is equal to or that is function of a pressure P0 in the pneumatic actuator 42. The spring 25 of the selecting valve 12 is calibrated such that the selecting valve 12 switches in the exhaust position when pressure P4 reaches P1 or according to the first alternative when P4 reaches P2 or according to the second alternative when P4 reaches the pressure P0 in the pneumatic actuator 42.

In a fifth embodiment (not shown) corresponding to the first embodiment of FIG. 2, the electro-pneumatic sensor M1 generates an electric or electronic signal that depends on the pressure P3 or P4 and that is transmitted to an electronic control unit (ECU) of the vehicle. This signal is then treated by the ECU which in turn generates and emits the electrical signal S1 to control the position of the valve 12.

Figure 8:
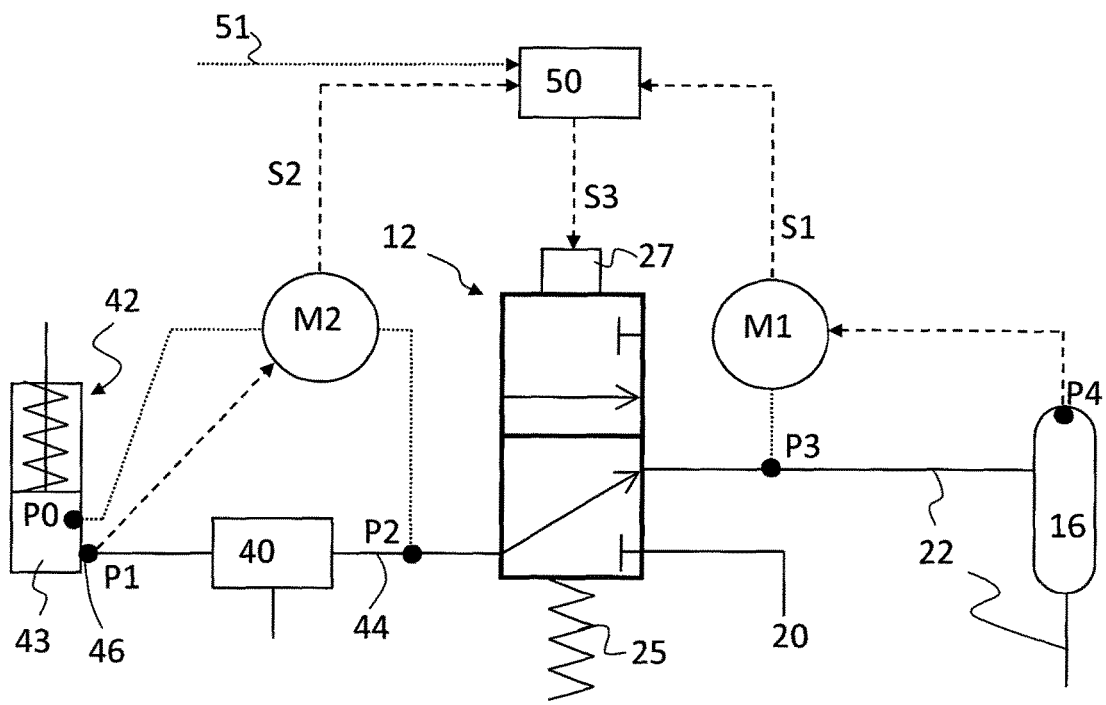
FIG. 8 is a schematic view showing a part of a pneumatic actuator system, with a selecting valve, according to a sixth embodiment of the invention.

A sixth embodiment is depicted on FIG. 8. This sixth embodiment is a variant of the second embodiment of FIG. 4. Hereafter, only the differences with respect to the second embodiment are detailed.

As depicted on FIG. 8, the electro-pneumatic sensors M1 and M2 are connected to an electronic control unit (ECU) 50 of the vehicle. ECU 50 can be a dedicated one or can be shared with another function of the vehicle. The electro-pneumatic sensors M1 and M2 are able to generate electric or electronic signals S1, S2 depending on the pressure that they respectively measure, for instance P4 and P1, and that are transmitted to the ECU 50 of the vehicle. These signals are processed by the ECU 50 which compared signals relative to both pressures and that in turn emits the electric signal 53 to control the position of the selecting valve 2 depending on the result of the comparison between both pressures P4 and P1. In a first alternative of this sixth embodiment, M1 and M2 measure P4 and P2 which are compared by ECU 50 to control the position of the selecting valve 12. In a second alternative of this sixth embodiment, M1 and M2 measure P4 and a pressure P0 inside the pneumatic actuator 42, for instance in the working chamber 43, which are compared by ECU 50 to control the position of the selecting valve 12.

The ECU 50 can also receive information 51, for instance via a CAN bus, from the ECU controlling the position of the switching valve 40, in order to know if the pneumatic actuator 42 is in an working phase or it an exhaust phase. By using this information the ECU 50 can control the selecting valve such that before or at the beginning of a new exhaust phase of the pneumatic actuator 42 the selecting valve 16 is automatically switched to its recirculation position provided that the pressure in the air tank 16 is not already at a predetermined maximum pressure.

In a variant, instead of using an electronic control unit, electric signals S1, S2 generated by the electro-pneumatic sensors M1 and M2 can be compared by an electric control unit, that is able to emit, depending on the result of the comparison, an electric signal to control the position of the selecting valve 12.

By switching in the exhaust position, a counter-pressure in the pneumatic actuator system 2 is avoided.

According to still another alternative embodiment of the invention, the valve 12 switches in the exhaust position when the difference between the pressure P4 in the air tank 16 and the pressure P1, the difference between the pressure P4 in the air tank 16 and the pressure P2 or the difference between the pressure P4 in the air tank 16 and a pressure P0 measured inside the working chamber 43 of the actuator 42, is inferior to a threshold value.

Figure 9:
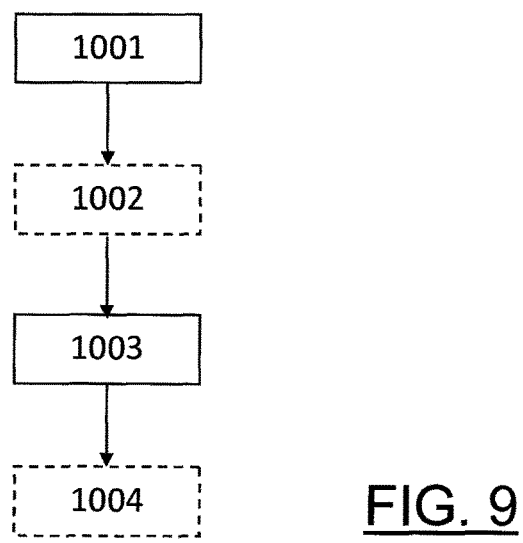
FIG. 9 is a flow chart of a method according to the invention.

A method according to the invention, and that can be implemented for controlling anyone of the embodiments previously described, is represented on FIG. 9 where a flowchart shows the main steps of this method.

The method comprises the steps of:
 detecting 1001 at least one air pressure P0, P1, P2, P3, P4 between the pneumatic actuator 42 and the second intake 26,
 switching 1003 the selecting valve 12 between a recirculation position and an exhaust position depending on said at least one air pressure P0, P1, P2, P3, P4.

In a first variant in connection, for instance, with the first, the third or the fifth embodiment previously described, the step 1001 can consist in or comprise detecting at least one air pressure P3, P4 in the recirculation line 22 downstream from the selecting valve 12 or in the air tank 16.

According to this first variant, in step 1003 the selecting valve 12 switches in the exhaust position when the pressure P3, P4 in the air tank 16 or in the recirculation line 22, raises up to a pressure threshold value (P3*th*, P4*th*).

In second variant in connection, for instance, with the second, the fourth or the sixth embodiment, the step 1001 can consist in or comprise detecting at least a first air pressure P3, P4 in the recirculation line 22 downstream for the selecting valve 12 or preferably in the air tank 16 and a second air pressure P0, P1, P2 upstream from said selecting valve 12 preferably in the outlet 46 of the pneumatic actuator 42, in the exhaust line 44 of the pneumatic actuator 42 or in the pneumatic actuator 42.

Preferably, according to the second variant, the method further comprises after step 1001, the step 1002 of comparing the first P3, P4 and the second pressures P0, P1, P2.

According to a first implementation of the second variant, in step 1003, the selecting valve 12 can switch in the exhaust position when the first pressure P3,P4 is balanced with the second pressure P0, P1, P2.

According to a first implementation of the second variant, in step 1003, the selecting valve 12 switches in the exhaust position when the difference between the first pressure P3, P4, and the second pressure P, P2 is inferior to a threshold value.

The method may comprise a further step 1004 where the selecting valve 12 returns to its recirculation position.

Preferably, when step 1004 is performed according to the first variant of the method and in connection, for instance, with the first, the third or the fifth embodiment previously described, the selecting valve 12 may return to its recirculation position as soon as the pressure P3 or the pressure P4 drops below the pressure threshold value P3*th* or P4*th*.

Preferably, when step 1004 is performed according to the second variant of the method and in connection, for instance, with the second, the fourth or the sixth embodiment previously described, the selecting valve 12 may return to its recirculation position when the pressure P0, P or P4 measured upstream of the selecting valve 12 becomes higher than the pressure P3 or P4 measured downstream from the selecting valve 12. When the pneumatic actuator 42 enters into its working phase, the switching valve 40 switches in a feeding position, the outlet 46 of the pneumatic actuator 42 becomes an inlet of the pneumatic actuator 42 and pressures P0 and P1 becomes higher than P3 or P4 that causes the selecting valve 12 to switch from the exhaust position to the recirculation position. When P2 is compared to P3 or P4, the selecting valve 12 can switch from the exhaust position to the recirculation position at the start of the exhaust phase of the pneumatic actuator 42 when the switching valve 40 switches from the feeding position to the discharge position because P2 becomes temporary higher than P3 or P4. In this latter option a flow control valve (not shown) can eventually be provided downstream from the point of detection of the pressure P2 on the exhaust line 44 in order to increase the period during which P2 remains higher than P3 or P4.

When an ECU 50 is used to control the position of the selecting valve 12, for instance in the sixth embodiment (FIG. 8), the ECU 50 can also receive information 51 from the ECU controlling the position of the switching valve 40, in order to control the switching of selecting valve 12 from its exhaust position to its recirculation position before the next exhaust phase of the pneumatic actuator 42 and provided that the pressure in the air tank 16 is not already at a predetermined maximum pressure.

The technical features of the different embodiments and alternatives embodiments of the invention mentioned here above can be combined together to generate new embodiments of the invention.

The invention claimed is:

1. Pneumatic actuator system for a vehicle, comprising: at least one pneumatic actuator,
 a compressor, providing compressed air to the pneumatic actuator,
 a first intake to supply the compressor with external air, and
 a second intake connected, via a recirculation line, to an exhaust line of the pneumatic actuator and arranged to supply the compressor with air discharged from the pneumatic actuator wherein the pneumatic actuator system also includes a selecting valve which is arranged on the exhaust line of the pneumatic actuator, between the pneumatic actuator and the compressor, this selecting valve is switchable between a recirculation position, where the air flow discharged by the pneumatic actuator is directed to the recirculation line, and an exhaust position where the air flow discharged by the pneumatic actuator is directed to a low pressure circuit, depending at least on pressure of the air in the recirculation line downstream from the selecting valve or in an air tank that is arranged downstream from the selecting valve on the recirculation line and wherein air discharged from the pneumatic actuator can accumulate.

2. System according to claim 1, wherein the low pressure circuit is opened to the atmosphere or is connected to the circuit of a low pressure system.

3. System according to claim 1 wherein the air tank is arranged between the selecting valve and the second intake.

4. System according to claim 1, wherein the selecting valve switches in the exhaust position when the pressure of air in the air tank, or the pressure of air in the recirculation line, increases to a pressure threshold value.

5. System according to claim 1, wherein it further comprises at least one pressure sensor to measure pressure of the air in the recirculation line downstream from the selecting valve or in the air tank.

6. System according to claim 5, wherein the system comprises at least two pressure sensors:
a first pressure sensor to measure downstream from the selecting valve in the recirculation line or preferably in the air tank, a first air pressure and
a second pressure sensor to measure upstream of the selecting valve, preferably in an outlet of the pneumatic actuator, in the exhaust line of the pneumatic actuator or in the pneumatic actuator, a second air pressure.

7. System according to claim 6, wherein the system comprises an electric unit or electronic control unit configured to compare the electric or electronic signals generated by the first sensor depending on the first air pressure and by the second sensors depending on the second air pressure and configured to generate a new signal depending on the result of the comparison to control the position of the selecting valve.

8. System according to claim 6, wherein the selecting valve switches in the exhaust position when the first air pressure is balanced with the second air pressure.

9. System according to claim 6, wherein the selecting valve switches in the exhaust position when the difference between the first air pressure and the second air pressure is inferior to a threshold value.

10. System according to claim 1, wherein it includes another valve, which allows switching between external air and air discharged from the pneumatic actuator in order to supply the compressor.

11. System according to claim 1, wherein it includes several pneumatic actuators and an air management system which carries out the repartition of air between the different pneumatic actuators of the system.

12. Method for controlling a pneumatic actuator system of a vehicle, wherein the pneumatic actuator system comprises:
at least one pneumatic actuator,
a compressor, providing compressed air to the pneumatic actuator,
a first intake, to supply the compressor with external air,
a second intake, connected to an exhaust line of the pneumatic actuator, via a recirculation line and arranged to supply the compressor with air discharged from the pneumatic actuator, and
a selecting valve which is arranged on the exhaust line of the pneumatic actuator, between the pneumatic actuator and the compressor, and which is able to switch between a recirculation position, where the air flow discharged by the pneumatic actuator is directed to the recirculation line, and an exhaust position where the air flow discharged by the pneumatic actuator is directed to a low pressure circuit, the method comprising the steps of:
detecting at least one pressure of air between the pneumatic actuator and the second intake,
switching the selecting valve between the recirculation position and the exhaust position depending on the at least one pressure of air.

13. Method according to claim 12 wherein the step of detecting at least one pressure of air between the pneumatic actuator and the second intake comprises the detection of a pressure of air in the recirculation line downstream from the selecting valve or in an air tank that is arranged on the recirculation line downstream from the selecting valve and wherein the air discharged from the pneumatic actuator can accumulate.

14. Method according to claim 13, wherein in the step of switching the selecting valve between the recirculation position and the exhaust position depending on the at least one pressure of air, the selecting valve switches in the exhaust position when the pressure of air in the air tank or in the recirculation line, increases to a pressure threshold value.

15. Method according to claim 12, wherein the step of detecting at least one pressure of air between the pneumatic actuator and the second intake comprises the detection of a first pressure of air in the recirculation line downstream from the selecting valve or preferably in an air tank arranged on the recirculation line downstream from the selecting valve, and the detection of a second pressure of air upstream from the selecting valve preferably in an outlet of the pneumatic actuator, in the exhaust line of the pneumatic actuator or in the pneumatic actuator.

16. Method according to claim 15, wherein following the step of detecting at least one pressure of air between the pneumatic actuator and the second intake, the method further comprises a step of comparing the first and the second pressures of air.

17. Method according to claim 15, wherein in the step of switching the selecting valve between the recirculation position and the exhaust position depending on the at least one pressure of air, the selecting valve switches in the exhaust position when the first pressure of air is balanced with the second pressure of air.

18. Method according to claim 15, wherein in the step of switching the selecting valve between the recirculation position and the exhaust position depending on the at least one pressure of air, the selecting valve switches in the exhaust position when the difference between the first pressure of air and the second pressure of air is inferior to a threshold value.

* * * * *